(12) United States Patent
Park et al.

(10) Patent No.: US 10,318,789 B2
(45) Date of Patent: Jun. 11, 2019

(54) DISPLAY DEVICE AND MANUFACTURING METHOD THEREOF

(71) Applicant: Samsung Display Co., Ltd., Yongin-si (KR)

(72) Inventors: Jeongwoo Park, Yongin-si (KR); Mingu Kim, Seoul (KR); Woojin Cho, Yongin-si (KR); Seungho Kim, Ansan-si (KR); Jongin Baek, Hwaseong-si (KR); Heekyun Shin, Incheon (KR); Hyunjoon Oh, Seongnam-si (KR); Junhyuk Cheon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 69 days.

(21) Appl. No.: 15/475,989

(22) Filed: Mar. 31, 2017

(65) Prior Publication Data

US 2017/0357842 A1    Dec. 14, 2017

(30) Foreign Application Priority Data

Jun. 10, 2016    (KR) .................. 10-2016-0072262

(51) Int. Cl.
*G06K 9/20* (2006.01)
*G06K 9/00* (2006.01)
*C03C 17/02* (2006.01)
*C03C 17/23* (2006.01)

(52) U.S. Cl.
CPC .......... *G06K 9/00053* (2013.01); *C03C 17/02* (2013.01); *C03C 17/23* (2013.01); *G06K 9/0002* (2013.01)

(58) Field of Classification Search
CPC ... G06K 9/00006–9/0012; C03B 21/06; C03B 19/00–20/00
See application file for complete search history.

(56) References Cited

U.S. PATENT DOCUMENTS

| | | | |
|---|---|---|---|
| 6,700,639 B2 | 3/2004 | Tatemura et al. | |
| 2013/0108124 A1* | 5/2013 | Wickboldt | G06K 9/00053 |
| | | | 382/124 |
| 2013/0192305 A1 | 8/2013 | Black et al. | |
| 2015/0030217 A1 | 1/2015 | Wickboldt et al. | |
| 2015/0259237 A1 | 9/2015 | Kwon et al. | |

(Continued)

FOREIGN PATENT DOCUMENTS

| CN | 104834892 | 8/2015 |
|---|---|---|
| KR | 10-2014-0017855 | 2/2014 |

(Continued)

OTHER PUBLICATIONS

Y. Launay et al., "Thermal Effects of Lasers on Dental Tissues", Lasers in Surgery and Medicine 7:473-477 (1987), p. 473-477. (Year: 1987).*

(Continued)

*Primary Examiner* — Brian Werner
(74) *Attorney, Agent, or Firm* — H.C. Park & Associates, PLC

(57) ABSTRACT

A display device includes a display panel, a fingerprint recognition sensor on the display panel, and a cover glass on the fingerprint recognition sensor. The cover glass is defined with at least one groove on a surface that faces the display panel.

23 Claims, 7 Drawing Sheets

(56) References Cited

U.S. PATENT DOCUMENTS

| | | | |
|---|---|---|---|
| 2015/0371076 A1 | 12/2015 | Lee et al. | |
| 2016/0148031 A1* | 5/2016 | Lin | G06K 9/00053 |
| | | | 382/124 |
| 2016/0224178 A1* | 8/2016 | Yang | G06K 9/00013 |
| 2016/0224822 A1* | 8/2016 | Hasegawa | C03C 21/002 |
| 2016/0357294 A1* | 12/2016 | Ozeki | C03C 15/00 |
| 2016/0364036 A1* | 12/2016 | Deng | A61B 5/02438 |
| 2017/0344785 A1* | 11/2017 | Zhang | G06K 9/0004 |
| 2017/0371461 A1* | 12/2017 | Lee | G06K 9/00 |
| 2017/0372123 A1* | 12/2017 | Kim | G06F 3/0412 |

FOREIGN PATENT DOCUMENTS

| | | |
|---|---|---|
| KR | 10-2014-0068834 | 6/2014 |
| KR | 10-2015-0057622 | 5/2015 |
| KR | 10-2016-0043217 | 4/2016 |

OTHER PUBLICATIONS

Christoph Hermanns, "Lecture 25: Cutting of Glass", IMI-NFG Glass Processing Course, Spring 2015, MDI Advanced Processing GmbH, Mainz, Germany, pp. 1-60. (Year: 2015).*

The Extended European Search Report dated Mar. 20, 2018, issued in European Application No. 17174665.4.

The Partial European Search Report dated Oct. 20, 2017, issued in European Application No. 17174665.4.

* cited by examiner

DISPLAY DEVICE AND MANUFACTURING METHOD THEREOF

CROSS-REFERENCE TO RELATED APPLICATION

This application claims priority from and the benefit of Korean Patent Application No. 10-2016-0072262, filed on Jun. 10, 2016, which is hereby incorporated by reference for all purposes as if fully set forth herein.

BACKGROUND

Field

Exemplary embodiments relate to a display device and a method of manufacturing the display device, and more particularly, to a display device including a fingerprint recognition sensor and a method of manufacturing the display device.

Discussion of the Background

Recently, various functions have been applied to display devices in addition to an image representation function. For example, display devices may include a fingerprint recognition sensor.

The fingerprint recognition sensors may be classified into a capacitive type, an optical type, a thermal type, and an ultrasonic type. Among the types of the fingerprint recognition sensors, the fingerprint recognition sensor of a capacitive type recognizes a fingerprint using a capacitance difference based on a distance between a ridge of the fingerprint and a valley of the fingerprint, which is sensed by finely disposed sensing electrodes.

Sensitivity of the fingerprint recognition sensor may vary based on permittivity of a cover glass, thickness of the cover glass, or the like. In other words, as the permittivity of the cover glass increases and the thickness of the cover glass decreases, the sensitivity of the fingerprint recognition sensor may increase.

However, there is a limitation in improving the sensitivity of the fingerprint recognition sensor due to material characteristics and strength degradation of the cover glass.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device capable of improving sensitivity of a fingerprint recognition sensor while effectively reducing strength degradation of a cover glass and to a method of manufacturing the display device.

Additional aspects will be set forth in the detailed description which follows, and, in part, will be apparent from the disclosure, or may be learned by practice of the inventive concept.

An exemplary embodiment discloses a display device that includes a display panel, a fingerprint recognition sensor on the display panel, and a cover glass on the fingerprint recognition sensor. The cover glass may be defined with at least one groove on a surface that faces the display panel.

An exemplary embodiment discloses a method of manufacturing a display device that includes defining a groove in a cover glass, accommodating a fingerprint recognition sensor in the groove, and coupling the cover glass and the display panel. The defining of the groove in the cover glass includes contacting a heat source to a portion of the cover glass to be defined with the groove, moving the heat source at a predetermined speed to chamfer the cover glass, and cooling the cover glass rapidly.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
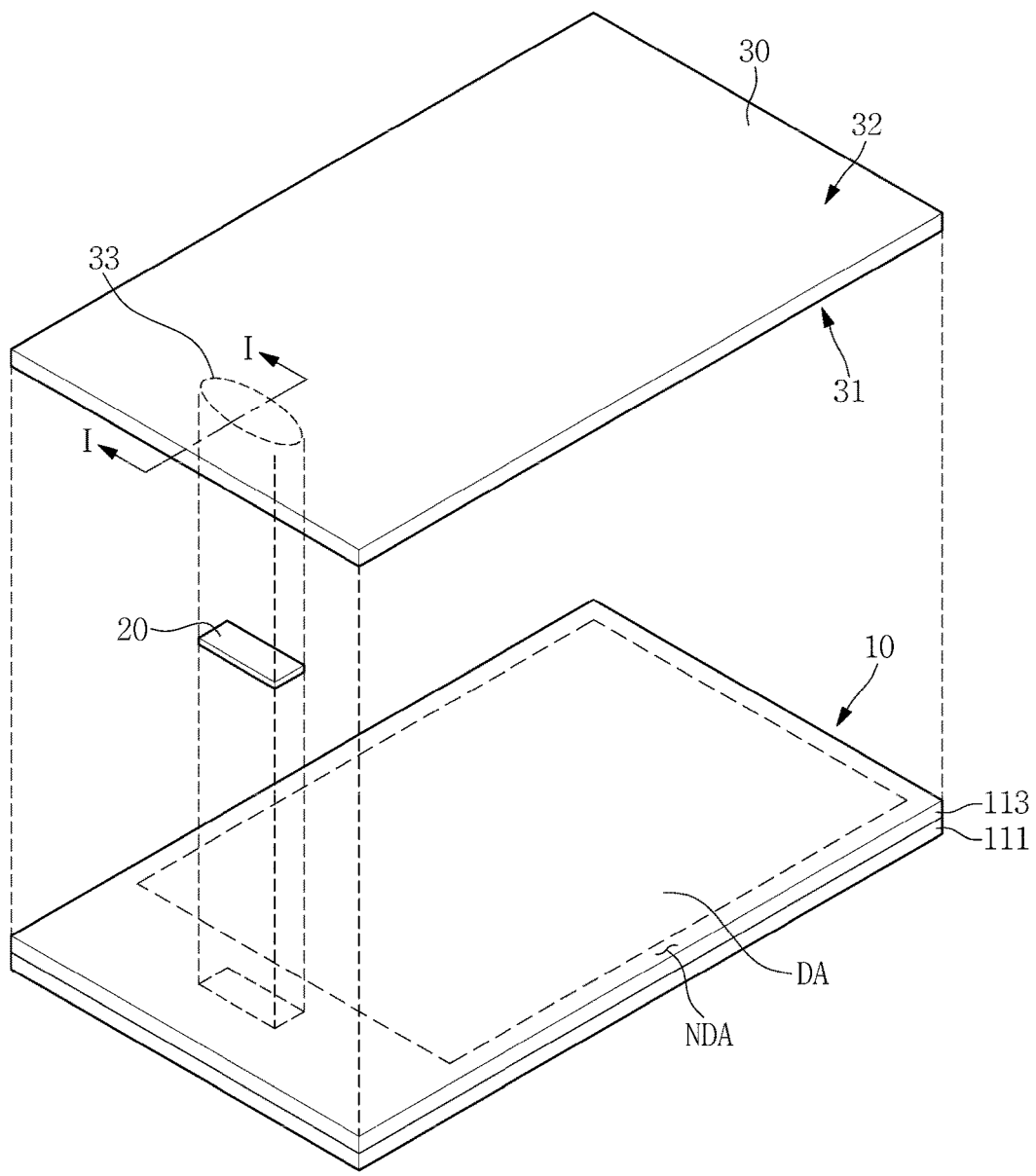
FIG. 1 is an exploded perspective view illustrating an exemplary embodiment of a display device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein. As used herein, "groove" refers to a cavity or indentation formed relative to a surface, as generally disclosed in the accompanying figures, and is not necessarily elongated, although it may be somewhat elongated.

Figure 2:
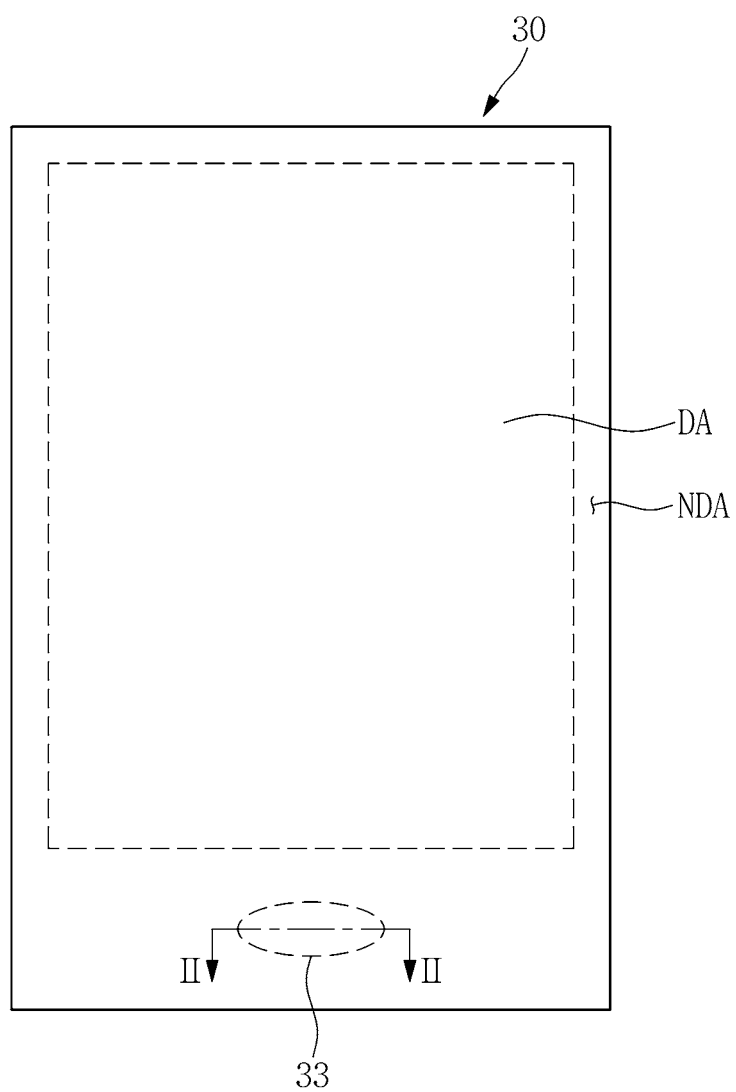
FIG. 2 is a plan view illustrating an exemplary embodiment of a display device.
Figure 3:
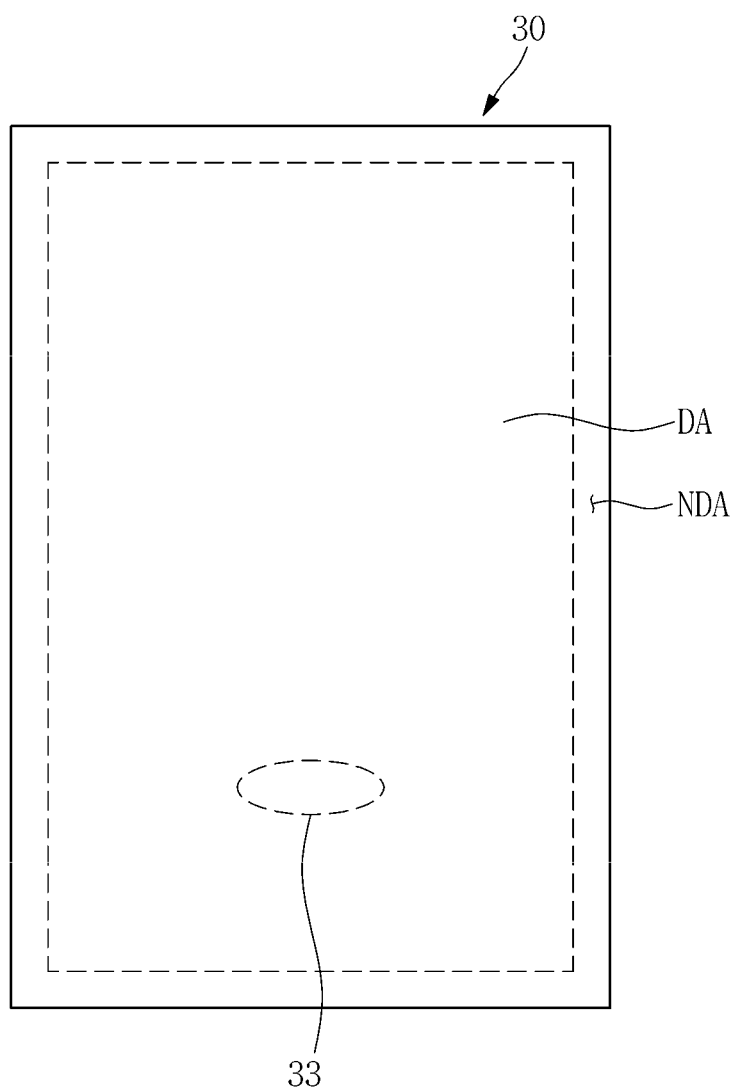
FIG. 3 is a plan view illustrating an alternative exemplary embodiment of a display device.

FIG. 1 is an exploded perspective view illustrating an exemplary embodiment of a display device, FIG. 2 is a plan view illustrating an exemplary embodiment of a display device, and FIG. 3 is a plan view illustrating an alternative exemplary embodiment of a display device.

Referring to FIG. 1, an exemplary embodiment of a display device includes a display panel 10, a fingerprint recognition sensor 20 on the display panel 10, and a cover glass 30 on the fingerprint recognition sensor 20.

The display panel 10 may use any suitable panel, e.g., a liquid crystal display (LCD) panel, an organic light emitting diode (OLED) display panel, and a plasma display panel (PDP), which may display an image, without limitation. Hereinbelow, the display panel 10 is described under the assumption that it is an LCD panel.

The display panel 10 may include a first substrate 111, a second substrate 113 opposing the first substrate 111, and a liquid crystal layer (not illustrated) between the first substrate 111 and the second substrate 113.

The display panel 10 may include a display area DA on which an image is displayed and a non-display area NDA around the display area DA.

The fingerprint recognition sensor 20 may be disposed in the non-display area NDA of the display panel 10. An exemplary embodiment of the fingerprint recognition sensor 20 is described under the assumption that it may be disposed in the non-display area NDA of the display panel 10, but exemplary embodiments are not limited thereto. In an alternative exemplary embodiment, the fingerprint recognition sensor 20 may be disposed in the display area DA of the display panel 10.

Any commonly used fingerprint recognition sensor may be applied to an exemplary embodiment of the present disclosure without limitation. The fingerprint recognition sensor 20 may include a plurality of sensing electrodes arranged in a matrix form and a plurality of driving electrodes connected to the sensing electrodes.

The cover glass 30 may be disposed over an entire surface of the display panel 10 on which the fingerprint recognition sensor 20 is disposed. That is, the cover glass 30 may be disposed to cover the display area DA and the non-display area NDA of the display panel 10.

The cover glass 30 may include a first surface 31 facing the display panel 10 and a second surface 32 which is an outer surface of the display device. The first surface 31 of the cover glass 30 may be defined with an arch-shaped groove 33 in which the fingerprint recognition sensor 20 is accommodated.

The groove 33 is depicted in FIGS. 1, 2, and 3 as having an elliptical shape on a plane, but exemplary embodiments are not limited thereto. The groove 33 may have any suitable shape or size on a plane based on the shape and size of the fingerprint recognition sensor 20. In other words, the groove 33 may have various planar shapes such as a quadrangular shape, a circular shape, and an elliptical shape without departing from the inventive concept.

In addition, referring to FIG. 2, in a case where the fingerprint recognition sensor 20 is disposed in the non-display area NDA of the display panel 10, the groove 33 may be defined at a portion of the cover glass 30 corresponding to the non-display area NDA of the display panel 10.

Similarly, referring to FIG. 3, in a case where the fingerprint recognition sensor 20 is disposed in the display area DA of the display panel 10, the groove 33 may be defined at a portion of the cover glass 30 corresponding to the display area DA of the display panel 10.

In addition, although the cover glass 30 defined with a single groove 33 is depicted in FIGS. 2 and 3, exemplary embodiments are not limited thereto. In another exemplary embodiment, the cover glass 30 may be defined with at least one groove 33. For example, the cover glass 30 may be defined with at least one groove in each of the display area DA and the non-display area NDA. That is, a groove may be defined in a predetermined portion of the cover glass 30.

The cover glass 30 may be, for example, glass or sapphire, and it is assumed that an exemplary embodiment of the cover glass 30 is a glass of which a coefficient of thermal expansion ($10^{-7}$/° C.) is about 50 or higher.

In addition, although not illustrated in FIG. 1, a touch screen panel (not illustrated) may further be disposed between the display panel 10 and the cover glass 30. The touch screen panel (not illustrated) may detect presence and location of a touch input. For example, a user may use the touch screen panel using a stylus pen (or a user's finger). The touch screen panel may include a transparent material.

Figure 4:
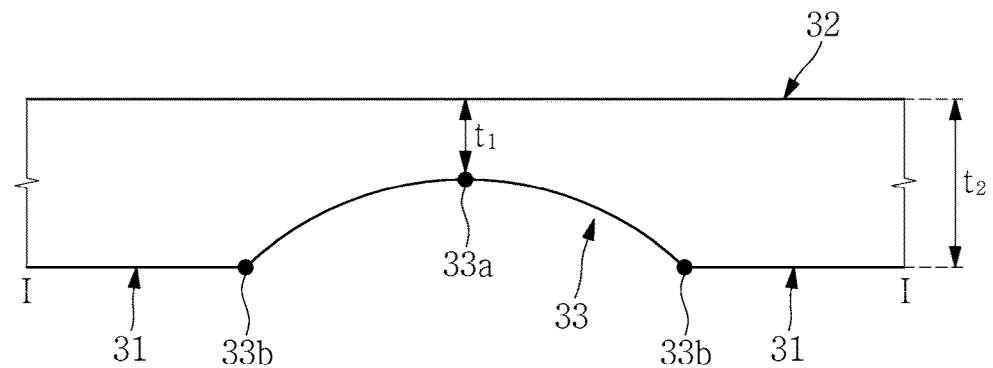
FIG. 4 is a cross-sectional view taken along line I-I of FIG. 1.

FIG. 4 is a cross-sectional view taken along line I-I of FIG. 1.

Referring to FIG. 4, an exemplary embodiment of the cover glass 30 includes the first surface 31 facing the display panel 10 and the second surface 32 which may be an outer surface of the display device. The first surface 31 may be defined with the groove 33 in which the fingerprint recognition sensor or the like is accommodated.

However, exemplary embodiments are not limited thereto, and an alternative exemplary embodiment of the cover glass 30 may be defined with an arch-shaped groove in the second surface 32.

A cross-section of the groove 33 may have an arch shape. In FIG. 4, the groove 33 is depicted as having an arch shape which is symmetrical with respect to a central portion 33a of the groove 33, but exemplary embodiments are not limited thereto. In an alternative exemplary embodiment, the groove 33 may have an arch shape which is non-symmetric with respect to the central portion 33a of the groove 33. That is, the cross-section of the groove 33 may be a curved surface.

In an exemplary embodiment, a thickness of the cover glass 30 may decrease in a gradual manner from a portion 33b from which the groove 33 begins toward the central portion 33a of the groove 33. That is, the groove 33 of the cover glass 30 may have a minimum thickness t1 at the central portion 33a.

The minimum thickness t1 may be about 5% to about 95% of a thickness t2 of the cover glass 30. For example, the minimum thickness t1 may be about 5% to about 30% of the thickness t2 of the cover glass 30.

In an exemplary embodiment, the thickness t2 of the cover glass 30 may be in a range of about 450 μm to about 550 μm and the minimum thickness t1 of the groove 33 may be in a range of about 150 μm to about 250 μm.

Figure 5:
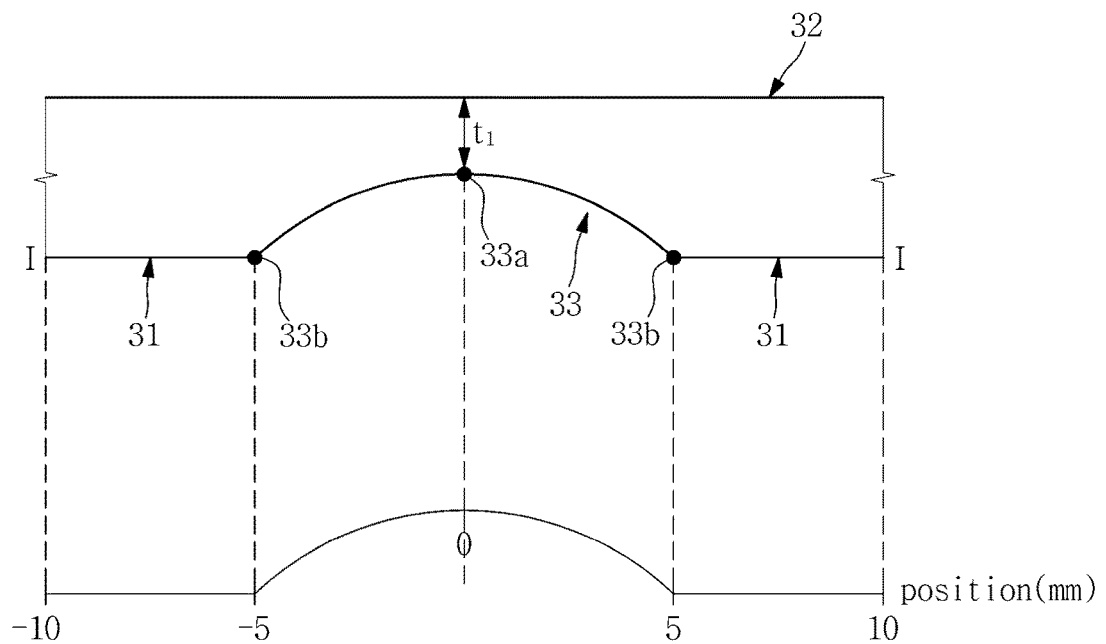
FIG. 5 and FIG. 6 are graphs illustrating residual stress of an exemplary embodiment of a cover glass.
Figure 6:
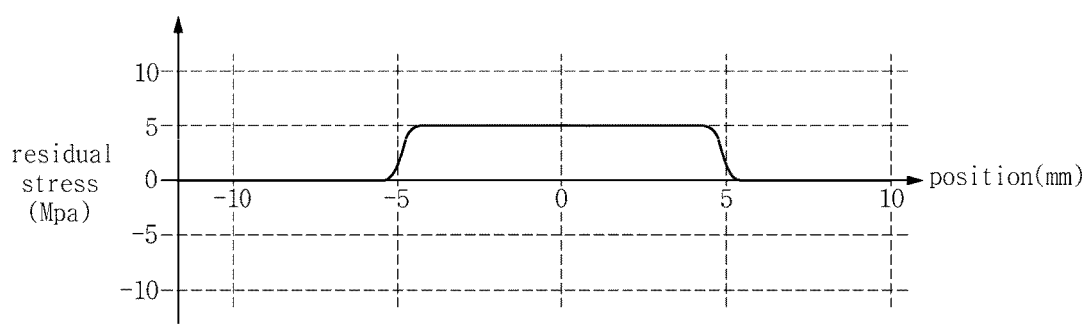

FIGS. 5 and 6 are graphs illustrating a residual stress of an exemplary embodiment of a cover glass.

FIG. 5 is a graph illustrating the first surface 31 of the cover glass 30 and a surface position of the groove 33, and FIG. 6 is a graph illustrating a residual stress at each surface position.

Referring to FIGS. 5 and 6, in the cover glass 30, a residual stress of a surface of the groove 33 is greater than a residual stress of the first surface 31. For example, the cover glass 30 may have a residual stress in a range of about 1 MPa to about 10 MPa at the surface of the groove 33.

The residual stress may be a stress that is generated inside a material which is processed or heat-treated, and the residual stress described herein may refer to a tensile stress or a compressive stress that is generated by thermal treatment, but exemplary embodiments are not limited thereto.

As an exemplary embodiment of the groove 33 of the cover glass 30 is defined through a thermal stripping process, which is to be described hereinbelow in regard to an exemplary embodiment of a method of manufacturing a display device, and a surface of the groove 33 may have a greater residual stress than that of the first surface 31.

Since the groove 33 has a residual stress, the groove 33 of the cover glass 30 may experience significantly low mechanical strength degradation, even though it has a smaller thickness than that of the first surface 31. In addition, since having an arch shape, the groove 33 may experience significantly low strength degradation with respect to a pressure, even though it has a smaller thickness than that of the first surface 31.

Similarly, as mechanical strength degradation of the groove 33 may be significantly reduced, the minimum thickness t1 of the groove 33 may be reduced to about 5% to about 30% of the thickness t2 of the cover glass 30, and accordingly, sensitivity of the fingerprint recognition sensor 20 accommodated in the groove 33 may be improved.

Figure 7:
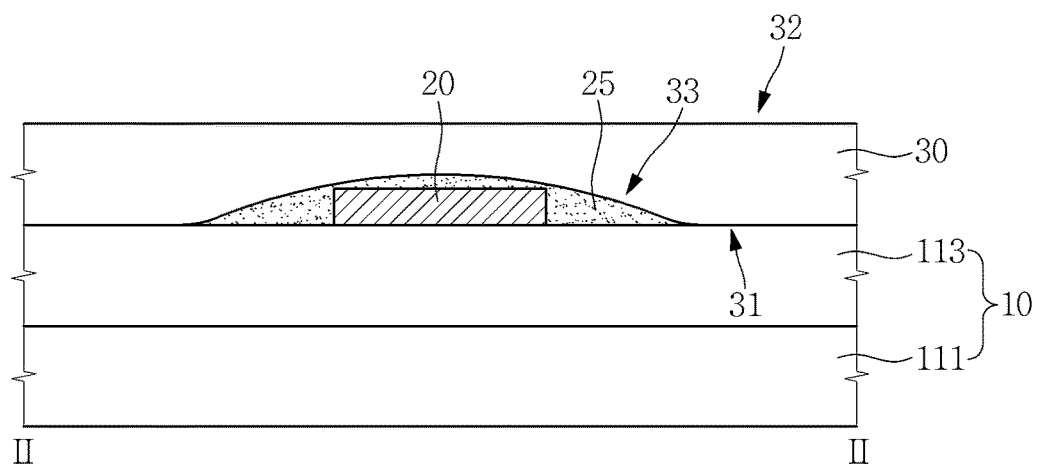
FIG. 7 is a cross-sectional view taken along line II-II of FIG. 2.
Figure 8:
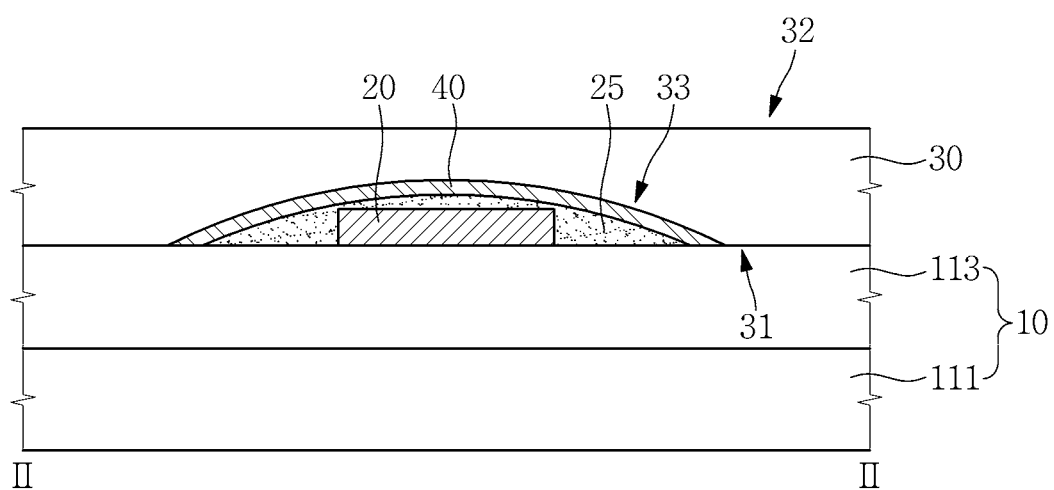
FIG. 8 is a cross-sectional view illustrating an alternative exemplary embodiment of a display device.

FIG. 7 is a cross-sectional view taken along line II-II of FIG. 2, and FIG. 8 is a cross-sectional view illustrating an alternative exemplary embodiment of a display device.

Referring to FIG. 7, an exemplary embodiment of a display device may include a display panel 10, a fingerprint recognition sensor 20 on the display panel 10, and a cover glass 30 on the display panel 10 on which the fingerprint recognition sensor 20 is disposed.

The cover glass 30 may be defined with a groove 33 on a first surface 31 which faces the display panel 10, in order to accommodate the fingerprint recognition sensor 20, and the fingerprint recognition sensor 20 accommodated in the groove 33 may be fixed to the cover glass 30 by an adhesive member 25.

The adhesive member 25 may be an adhesive member including a transparent material. For example, the adhesive member 25 may be an optically clear resin (OCR).

Referring to FIG. 8, an exemplary embodiment of a display device may include a display panel 10, a fingerprint recognition sensor 20 on the display panel 10, and a cover glass 30 on the display panel 10 on which the fingerprint recognition sensor 20 is disposed.

The cover glass 30 may be defined with a groove 33 in a first surface 31 which faces the display panel 10, in order to accommodate the fingerprint recognition sensor 20.

In addition, a high dielectric material 40 may further be disposed in the groove 33 of the cover glass 30.

The high dielectric material 40 may include at least one (or any combination) selected from the group consisting of: low-melting glass (LMG), ZnO, $Al_2O_3$, $Ta_2O_5$, $TiO_2$, $ZrO_2$, $La_2O_3$, and $Y_2O_3$. The LMG is a glass that further includes, for example, selenium, potassium, arsenic, and sulfur to achieve a melting point of about 130° C. to about 350° C.

The high dielectric material 40 may be formed on the groove 33 of the cover glass 30, having a thickness in a range of about 10 μm to about 100 μm. The high dielectric material 40 may be formed through a chemical vapor deposition process, a spin coating process, a sputtering process, a vacuum deposition process, and/or a printing process, for example.

The fingerprint recognition sensor 20 accommodated in the groove 33 of the cover glass 30 in which the high dielectric material 40 is disposed may be fixed to the cover glass 30 by an adhesive member 25. The adhesive member 25 may be an adhesive member including a transparent material. For example, the adhesive member 25 may be an optically clear resin (OCR).

In an exemplary embodiment of a display device, as the high dielectric material 40 is further disposed in the groove 33 of the cover glass 30, the groove 33 of the cover glass 30 may have a higher permittivity than a permittivity of the cover glass 30. Accordingly, a capacitance between the fingerprint recognition sensor 20 and a finger increases such that sensitivity of the fingerprint recognition sensor 20 may be improved.

Figure 9A:
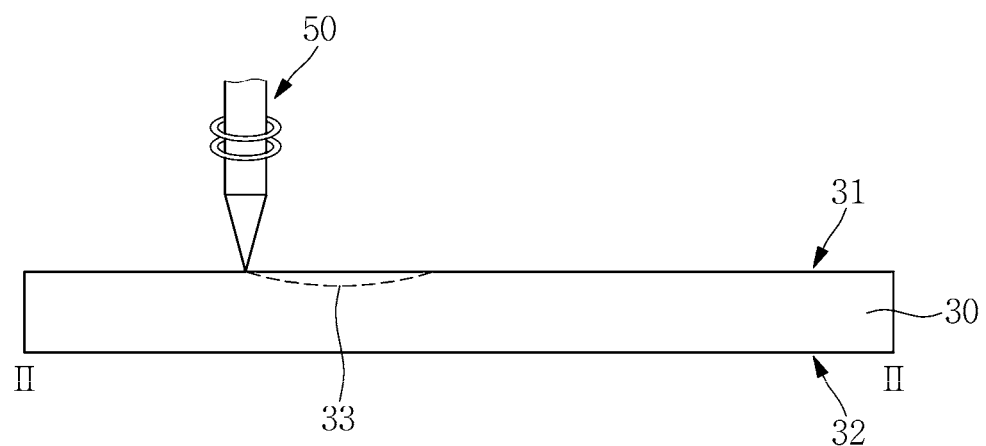
FIG. 9A and FIG. 9B are views illustrating an exemplary embodiment of a method of manufacturing a display device.
Figure 9B:
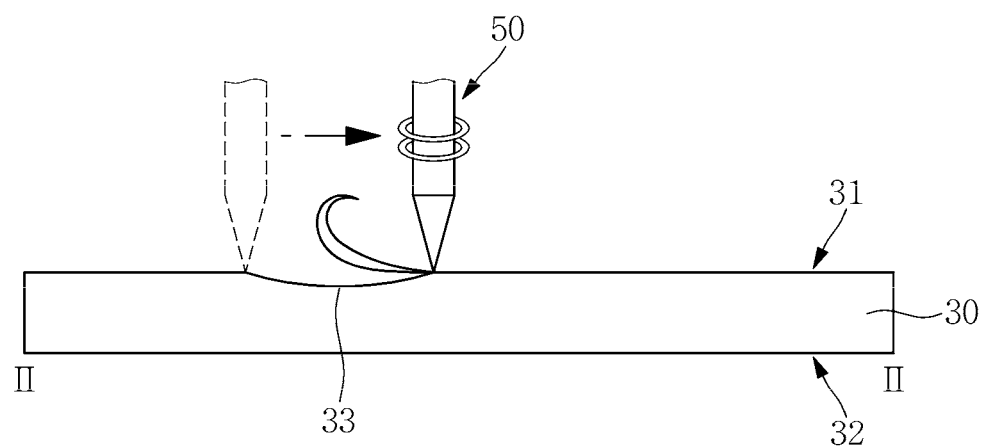

FIGS. 9A and 9B are views illustrating an exemplary embodiment of a method of manufacturing a display device.

An exemplary embodiment of a method of manufacturing a display device may include defining an arch-shaped groove in a cover glass, accommodating a fingerprint recognition sensor in the groove of the cover glass, and coupling the cover glass and the display panel.

Referring to FIGS. 9A and 9B, defining of a groove 33 in a cover glass 30 may include contacting a heat source 50 to a first surface 31 of the cover glass 30, moving (i.e., transferring) the heat source 50 at a predetermined speed to chamfer the first surface 31 of the cover glass 30, and rapidly cooling the cover glass 30.

In an exemplary embodiment, the heat source 50 may have a temperature in a range of about 1200° C. to about 1600° C., and may contact the cover glass 30 at a pressure in a range of about 100 kgf to about 500 kgf.

The heat source 50 may be moved in various manners based on a planar shape, an area, and a depth of the groove 33.

In a case where the cover glass 30 is heated to a high temperature and then rapidly cooled, the cover glass 30 may experience a stripping phenomenon between a surface thereof and an inner portion thereof due to a difference between an expansive force and a contractile force. Such a stripping phenomenon may occur more readily as a coefficient of thermal expansion of the cover glass 30 increases.

As such, an exemplary embodiment of the groove 33 of the cover glass 30 may be defined using the thermal stripping phenomenon. Accordingly, the surface of the groove 33 may have characteristics of a relatively low surface roughness similar to a surface of a mirror. In addition, as the process is relatively simple, a manufacturing cost and a manufacturing time may be reduced.

In addition, due to characteristics of the thermal stripping, the groove 33 may have an arch-shaped cross-section, and by virtue of its structural characteristics, strength against a pressure may be improved and a residual stress, e.g., thermal stress, may remain such that mechanical strength may be improved.

As such, in one or more exemplary embodiments of a display device, an arch-shaped groove is defined in a cover glass, and a fingerprint recognition sensor is accommodated therein, such that sensitivity of the fingerprint recognition sensor may be improved while strength degradation of the cover glass is significantly reduced.

In addition, in one or more exemplary embodiments of a method of manufacturing the display device, an arch-shaped groove is defined in a cover glass in a thermal stripping process such that a manufacturing process may be simplified and a manufacturing cost may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
    a display panel;
    a fingerprint recognition sensor on the display panel; and
    a cover glass on the fingerprint recognition sensor,
    wherein:
    the cover glass is defined with at least one groove on a surface that faces the display panel; and
    the groove has an arch-shaped cross-section having a continuous curvature such that a thickness of the cover glass decreases in a gradual manner from an edge of the groove to a central portion of the groove.

2. The display device of claim 1, wherein the fingerprint recognition sensor is accommodated in the groove.

3. The display device of claim 1, wherein the cover glass has a greater residual stress within the groove.

4. The display device of claim 3, wherein the groove of the cover glass has a residual stress in a range of 1 MPa to 10 MPa.

5. The display device of claim 1, wherein the cover glass has a minimum thickness at a central portion of the groove, and the minimum thickness is from 5 percent (%) to 95% of a thickness of the cover glass.

6. The display device of claim 5, wherein the minimum thickness is from 5% to 30% of the thickness of the cover glass.

7. The display device of claim 2, further comprising an adhesive member between the groove and the fingerprint recognition sensor.

8. The display device of claim 7, further comprising a high dielectric material between the groove and the adhesive member.

9. The display device of claim 8, wherein the high dielectric material comprises at least one material selected from the group consisting of low melting glass (LMG), ZnO, $Al_2O_3$, $Ta_2O_5$, $TiO_2$, $ZrO_2$, $La_2O_3$, and $Y_2O_3$.

10. The display device of claim 8, wherein the high dielectric material has a thickness in a range of 10 μm to 100 μm.

11. A method of manufacturing a display device, the method comprising:
    defining a groove in a cover glass;
    accommodating a fingerprint recognition sensor in the groove; and
    coupling the cover glass and a display panel,
    wherein:
    the defining of the groove in the cover glass comprises:
        contacting a heat source with a portion of the cover glass to be defined with the groove;
        moving the heat source at a predetermined speed to chamfer the cover glass; and
        cooling the cover glass rapidly;
    the defining of the groove in the cover glass further comprises disposing a high dielectric material in the groove; and
    the high dielectric material is LMG comprising material selected from the group consisting of selenium, potassium, arsenic, and sulfur.

12. The method of claim 11, wherein the cover glass has a greater residual stress within the groove.

13. The method of claim 12, wherein the groove of the cover glass has a residual stress in a range of 1 Mpa to 10 Mpa.

14. The method of claim 11, wherein the cover glass has a minimum thickness at a central portion of the groove, and the minimum thickness is in a range from 5% to 95% of a thickness of the cover glass.

15. The method of claim 14, wherein the minimum thickness is in a range from 5% to 30% of the thickness of the cover glass.

16. The method of claim 11, wherein the heat source has a temperature in a range from 1200° C. to 1600° C.

17. The method of claim 11, wherein the heat source contacts the cover glass at a pressure is in a range from 100 kgf to 500 kgf.

18. The method of claim 11, wherein the groove has an arch-shaped cross-section.

19. The method of claim 11, wherein the high dielectric material is selected from the group consisting of low melting glass (LMG), ZnO, $Al_2O_3$, $Ta_2O_5$, $TiO_2$, $ZrO_2$, $La_2O_3$, and $Y_2O_3$.

20. The method of claim 11, wherein the high dielectric material is disposed in the groove to a thickness in a range of 10 μm to 100 μm.

21. The method of claim 11, wherein the fingerprint recognition sensor is accommodated in the groove with an adhesive member.

22. The display device of claim 8, wherein the high dielectric material is LMG comprising material selected from the group consisting of selenium, potassium, arsenic, and sulfur.

23. The display device of claim 1, wherein the groove has a maximum depth at the central portion of the groove, and the maximum depth is greater than a thickness of the fingerprint recognition sensor.

\* \* \* \* \*